United States Patent
Larsen

(10) Patent No.: US 8,225,284 B2
(45) Date of Patent: Jul. 17, 2012

(54) METHODS AND SYSTEMS FOR TESTING SOFTWARE DEVELOPMENT

(75) Inventor: Marty P. Larsen, Hunterville, NC (US)

(73) Assignee: First Data Corporation, Greenwood Village, CO (US)

( * ) Notice: Subject to any disclaimer, the term of this patent is extended or adjusted under 35 U.S.C. 154(b) by 2828 days.

(21) Appl. No.: 10/704,383

(22) Filed: Nov. 6, 2003

(65) Prior Publication Data

US 2005/0114736 A1  May 26, 2005

(51) Int. Cl.
*G06F 9/44* (2006.01)
(52) U.S. Cl. ......... 717/124; 717/100; 717/126; 717/127
(58) Field of Classification Search ........... 717/124–127
See application file for complete search history.

(56) References Cited

U.S. PATENT DOCUMENTS

| | | | | |
|---|---|---|---|---|
| 5,729,676 A | * | 3/1998 | Inoue | 714/38 |
| 5,784,553 A | * | 7/1998 | Kolawa et al. | 714/38 |
| 7,032,212 B2 | * | 4/2006 | Amir et al. | 717/124 |
| 2001/0010091 A1 | * | 7/2001 | Noy | 716/4 |
| 2003/0212661 A1 | * | 11/2003 | Avvari et al. | 707/2 |
| 2004/0060039 A1 | * | 3/2004 | Fujikawa et al. | 717/124 |
| 2004/0133881 A1 | * | 7/2004 | Chamberlain et al. | 717/125 |
| 2004/0181713 A1 | * | 9/2004 | Lambert | 714/48 |
| 2005/0044533 A1 | * | 2/2005 | Nesbit et al. | 717/124 |
| 2005/0050519 A1 | * | 3/2005 | Schulte et al. | 717/121 |

* cited by examiner

*Primary Examiner* — Insun Kang
(74) *Attorney, Agent, or Firm* — Kilpatrick Townsend & Stockton LLP

(57) ABSTRACT

Methods and systems are provided for generating a test bed from an input data set that has multiple data elements. A development program, which includes multiple decision points, is executed using each of the data elements as input to the development program in a sequence. For each decision point, execution of the decision point by at least one of the data elements is identified. Those identified data elements are assigned for identification in the test bed.

16 Claims, 5 Drawing Sheets

METHODS AND SYSTEMS FOR TESTING SOFTWARE DEVELOPMENT

BACKGROUND OF THE INVENTION

This application is related generally to the development of software. More specifically, this application is related to methods and systems for testing software development.

One of the difficulties in developing software applications, particularly large software applications, is the potential for causing unintended errors with parts of the code as changes or additions are made to the code during development. Modern software codes can frequently include millions of lines of code and can be intended to process data-set collections that include hundreds of millions of elements. During development of the software, potentially dozens or more software developers may work on portions of the code, often in isolation from each other. It is a significant challenge during such initial development to ensure that the resulting code operates as desired on all of the data-set collections.

Even after the initial development of software, there is, moreover, frequently additional development that is to take place on the software. For example, the functionality of the software may be improved in response to requests from its users, or new functionality may be added to exploit the capabilities provided by the software further. This phase of development may be even more sensitive to changes that may be made in the software since it may be possible for those changes to disrupt the previously proper functioning of the software.

Significant time on the part of programmers is often spent during these development phases to test software in a variety of different circumstances to identify "bugs" and to undertake additional programming to eliminate such bugs. This testing is typically done on an ad hoc basis, with testers trying to ensure that as much relevant code as possible is tested by using test input that is as broad as possible. Because such attempts rely on the ingenuity of humans to identify the diversity of applicable circumstances, they are virtually always incomplete and, in practice, many relevant portions of the code remain untested. An alternative to relying on the ingenuity of human testers is to test the code as it is developed with the entire collection of input data sets. While this approach has the virtue of testing relevant portions of the code, it is highly inefficient. Testing with many of the data sets is redundant, and the sheer requirement of testing with a very large number of data sets is simply prohibitive because of the time it takes to do so, particularly if testing is to be performed as an ongoing part of the development project.

There is, accordingly, a general need in the art for methods and systems that permit more efficient testing during software development.

BRIEF SUMMARY OF THE INVENTION

Embodiments of the invention make use of a test bed that identifies a subset of data elements comprised by an input data set. The identified subset is chosen so that decision points of a development program that are encountered when the subset is used as input are the same as the decision points encountered when the entire input data set is used as input. Since the subset may be significantly smaller than the entire input data set, testing of modifications of the program may be performed more readily by using the subset, while remaining confident of the scope of test coverage.

Thus, in a first set of embodiments, a method is provided for generating a test bed from an input data set comprising a plurality of data elements. A development program is executed using each of the plurality of data elements as input to the development program in a sequence. For each of a plurality of decision points comprised by the development program, execution of the decision point by at least one of the data elements is identified. Those identified data elements are assigned for identification in the test bed.

The actual structure of the test bed may differ in different embodiments. For example, in one embodiment, assigning the identified data elements for identification in the test bed comprises adding an element identifier associated with them to the test bed. In another embodiment, assigning the identified data elements for identification in the test bed comprises adding them to the test bed. In any instance, duplicates of the data elements assigned for identification may be removed. There are, moreover, a number of ways to minimize the number of distinct identified data elements, such as by requiring the identified data element to be a last of the plurality of data elements to be executed by each of the plurality of decision points according to the sequence.

The decision points may correspond to different types of instructions comprised by the development program. For example, in one embodiment, at least one of the plurality of decision points comprises a program element having a capacity to change a logical flow of the development program. In another embodiment, at least one of the plurality of decision points comprises a program element having a capacity to break a logical flow of the development program.

In some embodiments, the test bed may be refined through subsequent use of additional data elements. In one such embodiment, a modification of the development program is executed using each of a second plurality of data elements. For each of a plurality of decision points comprised by the modification of the development program, execution of each such decision point by at least one of the second plurality of data elements is identified. Those data elements are also assigned for identification in the test bed.

In another set of embodiments, a method is provided for testing a modified development program derived from modification of an original development program. The modified development program is executed using each of a plurality of data elements as input to the modified development program. The plurality of data elements corresponds to a subset of an input data set. Execution of the original development program with each element of the input data set causes execution of a defined plurality of decision points comprised by the original development program. In addition, execution of the original development program with each of the plurality of data elements causes execution of the defined plurality of decision points. A determination is made whether the modified development program behaves as expected for the plurality of data elements.

In one embodiment, each of the plurality of data elements is selected from the input data set according to an element identifier comprised by a test bed. In another embodiment, the plurality of data elements themselves are comprised by a test bed. The decision points may correspond to different types of instructions, such as a program element having a capacity to change or break a logical flow of the original development program.

The methods of the present invention may be embodied in a computer-readable storage medium having a computer-readable program embodied therein for directing operation of a computer system. The computer system may include a processor and a storage device. The computer-readable program includes instructions for operating the computer system to generate a test bed from an input data set or to test a modified development program derived from a modification of an original development program in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention permit efficient testing of a development program. In one embodiment, the development program comprises a set of code that is intended to operate on an input data set. The input data set may be static, but more usually will change over time as elements are added to or removed from the input data set. At any particular time, however, the input data set may comprise a well-defined set of elements. In some instances, each element may be uniquely identified within the input data set according to an element identifier. Merely by way of example, in one embodiment, the development program could comprise a financial-software program used for processing credit-card transactions. The input data set could then comprise information related to each of a plurality of credit cards, including, for example, the name and address of the account holder, the credit limit associated with the credit card, what transactions have been executed, and the like. The element identifier that uniquely identifies each set of credit-card information could then correspond to the account numbers for respective credit cards. Of course, the development program is not limited to a financial-software program and embodiments of the invention may more generally be applied to any software program that uses an input data set.

Figure 1A:
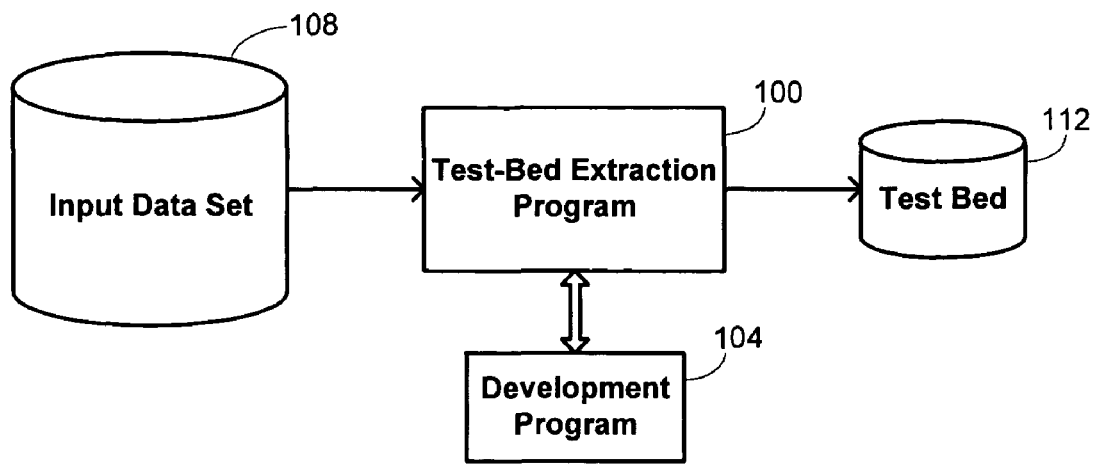
FIG. 1A is a schematic illustration of a system organization used to generate a test bed from an input data set.

Embodiments of the invention are used to generate a test bed from the input data set, the test bed identifying a subset of the elements defined by the input data set. The test bed may then subsequently be used in lieu of the input data set in subsequent testing of modifications of the development program. A schematic illustration of a structure used for generating the test bed is provided in FIG. 1A, and a schematic illustration of a structure used for testing a modification of the development program using the test bed is provided in FIG. 1B. In FIG. 1A, the development program 104 is shown under the control of a test-bed extraction program 100, which is configured to generate the test bed 112 from the input data set 108 as described in further detail below. In some instances, as shown in FIG. 1A, the test-bed extraction program 100 may be a separate program that calls the development program 104 as desired.

Alternatively, the test-bed extraction program 100 may instead correspond to a version of the development program 104 that has been adapted to provide the information used in generating the test bed 112. In such instances, the structure shown in FIG. 1A for the test-bed extraction and development programs 100 and 104 should be viewed merely as indicating a logical structure, with the actual test-bed extraction program 100 instead incorporating the development program 104. For example, as described below, generation of the test bed 112 may rely on the execution of certain portions of the development program 104. Accordingly, the test-bed extraction program 100 could correspond to an altered version of the development program 104 that includes instructions to note the execution of the specific instructions within the development program.

Figure 1B:
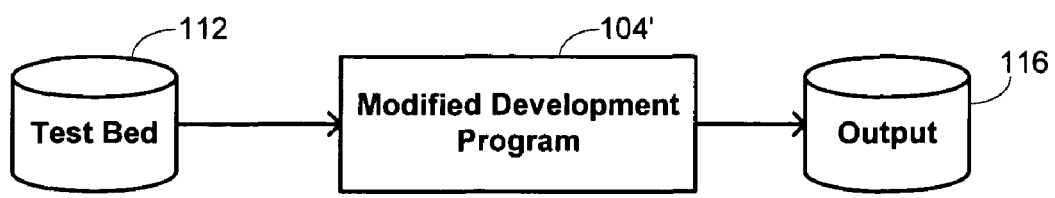
FIG. 1B is a schematic illustration of a system organization used to test a development program with the test bed.

FIG. 1B illustrates the subsequent use of the test bed 112 in testing a modified development program 104'. The modified development program 104' may correspond to any software code that uses or is derived from the original development program 104 with which the test bed 112 was generated. For example, the modified development program 104' could be a simplified version of the original development program 104, could be an extended version of the original development program 104 that includes enhanced functionality, could be a program that makes function calls to the original development program 104, and the like. The output 116 from execution of the modified development program 104' on the elements defined by the test bed 112 may be examined to determine whether the modified development program 104' is functioning as expected with those elements. Because of the manner in which the test bed 112 is generated, it may act as a surrogate for use of the entire input data set 108. The increases in efficiency of testing the modified development program 104' result from the relative number of elements defined by the test bed 112 compared with the number of elements in the input data set 108. For example, in some embodiments, such as is typical for the credit-card example discussed above, the input data set 108 could include 300 million elements and the test bed 112 might identify only 3000 of those elements, providing a $10^5$-fold improvement in execution time required to test the modified development program 104'

Figure 2:
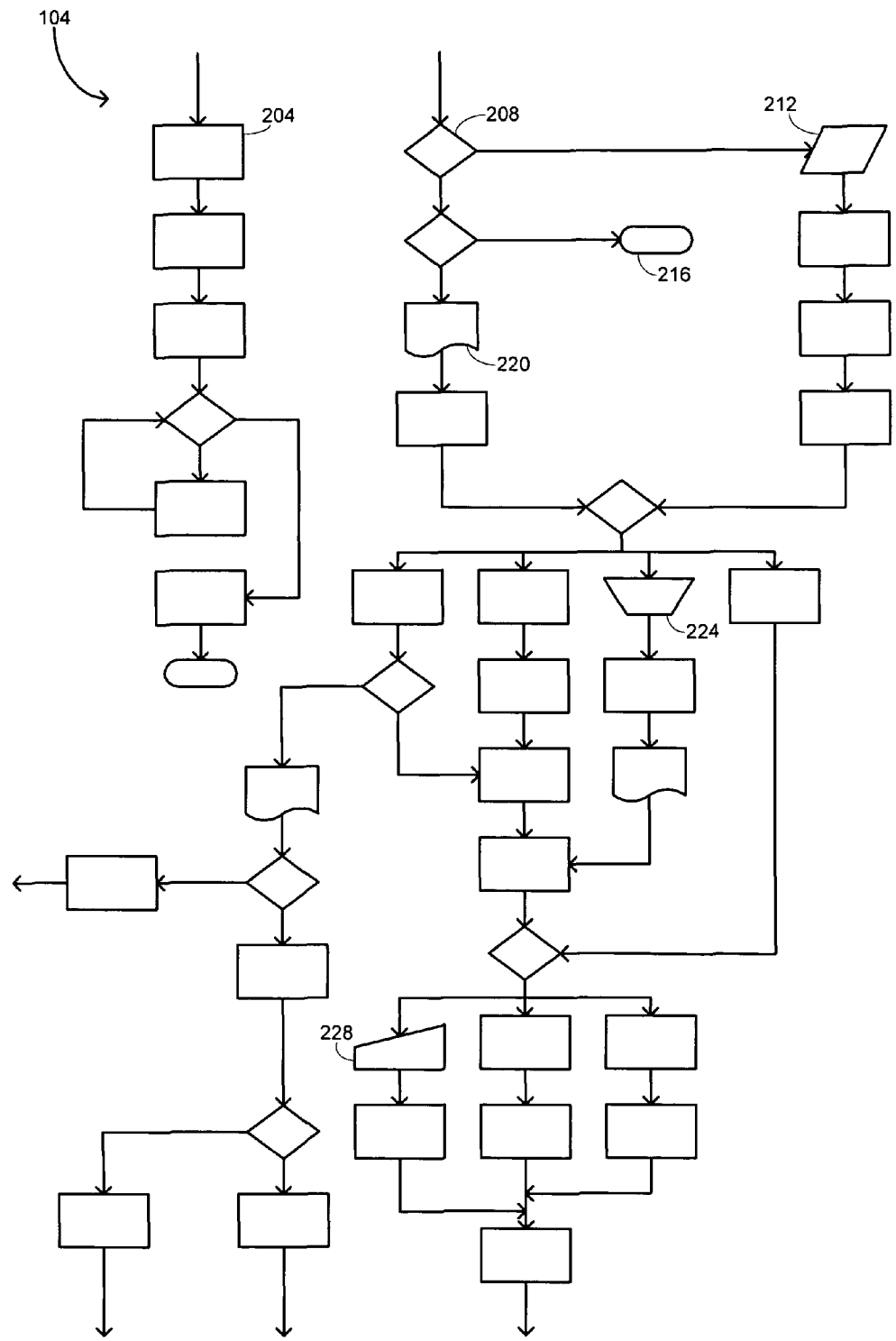
FIG. 2 is a schematic illustration of a flow structure for a development program.

To illustrate how the test bed 112 is generated, FIG. 2 provides a schematic illustration of an exemplary flow structure of the development program 104. This example is intended merely to illustrate that a typical development program 104 comprises a variety of different types of instructions, which are illustrated with different shapes in FIG. 2. For example, a process instruction, illustrated with a rectangle 204, corresponds generally to any instruction not having a more specialized symbol, usually an operation that results in a change of value, form, or location of information. A branch instruction, illustrated with a diamond 208, corresponds to an instruction that has multiple outputs depending on the value or state of information. An input instruction, illustrated with a rhombus 212, corresponds to a function performed by an input device to receive data. Conversely, an output instruction, illustrated with a page symbol 220, corresponds to a function performed by an output device to transmit data. An interrupt instruction, illustrated with a rounded rectangle 224, corresponds to an instruction that starts, terminates, halts, delays, or otherwise interrupts the flow of the program. The trapezoid symbol 224 is used to designated a manual operation, i.e. a function that is performed by human as the program is executed. Similarly, symbol 228 is used to designate a manual input operation where data is collected during execution of the program from a human.

Embodiments of the invention use the test-bed extraction program to identify "decision points" within the development program 104. The scope of such decision points may depend on the specific application, but generally do not include process instructions 204. This definition comports with what is well known to those of skill in the art, namely that the process instructions generally form the greatest component of a development program 104. The nonprocess instructions thereby generally define program elements that have the capacity to change and/or break a logical flow of the program. For instance, the branch instructions 208 are examples of those that have the capacity to change a logical flow of the program, and each of the input instructions 212, interrupt instructions 216, output instructions 220, manual-operation instructions 224, and manual-input instructions 228 are examples of those that have the capacity to break a logical flow of the program. Thus, while the decision points in some embodiments correspond to all non-process program elements, in other embodiments the decision points may be more restrictive. For example, in some embodiments, the decision points might be limited only to branch instructions 208, or might include all branch instructions 208 and a subset of those instructions having the capacity to break the program's logical flow. In other embodiments, the decision points might correspond to an even smaller subset.

In one embodiment, the subset of the input data set identified by test bed 112 is selected such that all decision points reached by the development program 104 using the full input data set 108 are also reached by the development program 104 using only the subset. The test bed itself 112 may identify the subset in any suitable manner. For example, the test bed 112 could comprise a list of the element identifiers that correspond to the selected data elements. Alternatively, the test bed 112 could comprise the selected data elements themselves.

Figure 3:
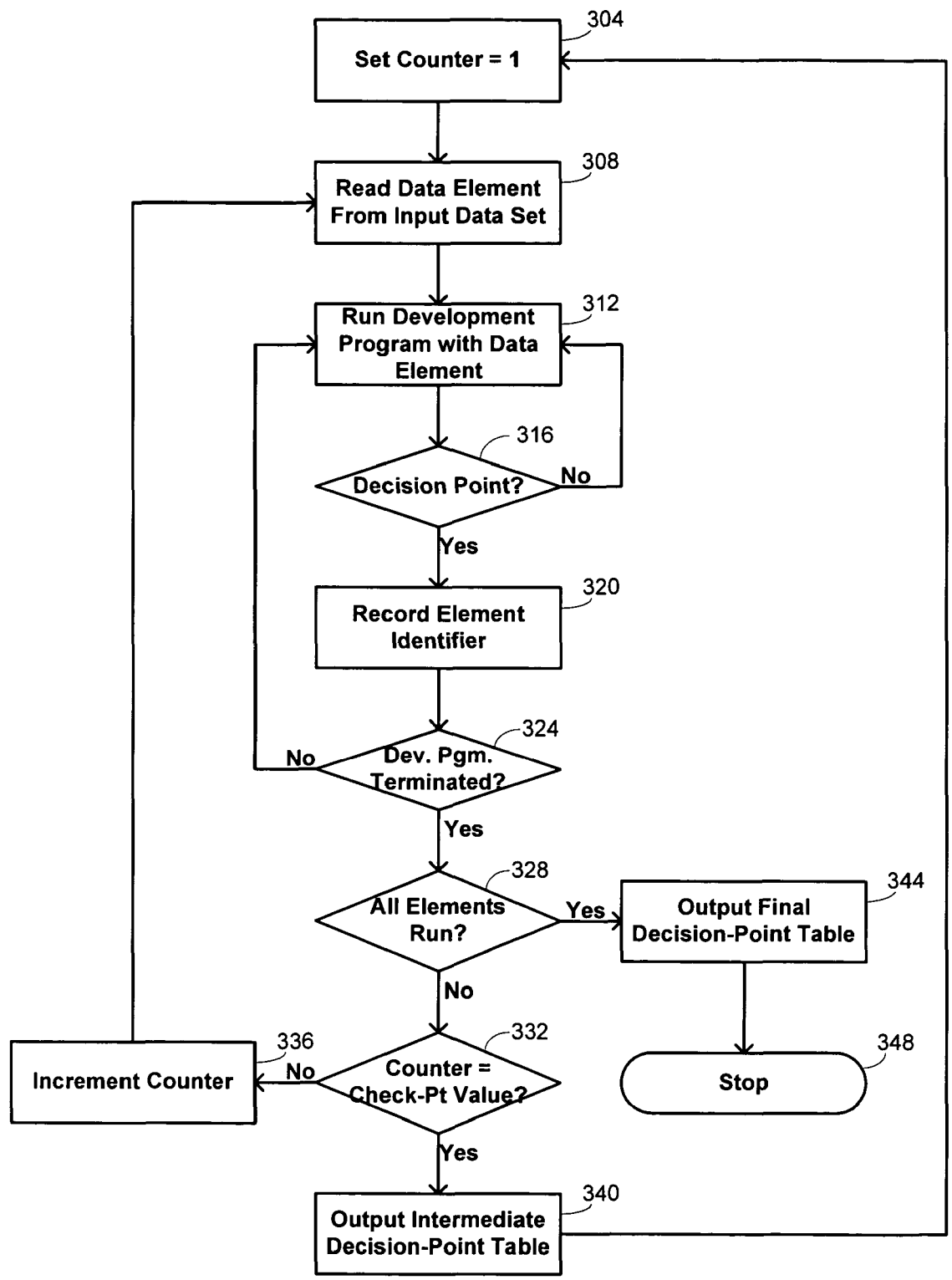
FIG. 3 is a flow diagram illustrating a method for generating the test bed from the input data set in an embodiment of the invention using the system organization of FIG. 1A.

The flow diagram of FIG. 3 provides an exemplary illustration of the test-bed extraction program 100 in an embodiment. Briefly, each of the data elements comprised by the input data set 108 is used as input to the development program 104 in sequence, and for each decision point that is reached, at least one of the data elements is assigned for identification in the test bed 112. Thus, at block 304, a counter is initialized to coordinate the sequential use of data elements. At block 308, the data element corresponding to the current value of the counter is read from the input data set. The development program is run with that data element as input at block 312.

Whenever a decision point is reached, as checked at block 316, the element identifier for the current data element is recorded at block 320. The element identifier may be recorded, for example, in a decision-point table such as the one illustrated in FIG. 4. The table shown in this figure includes a column (the left column) that identifies each of the decision points that are reached. In the example, the decision points are designated using pseudocode representations of the instructions that are performed, but in other embodiments a different designation could be used, such as the program line number of the corresponding instruction. Another column (the right column) provides the data-element identifier corresponding to the data element, such as the account number of a credit card in the example discussed above.

At block 324 in FIG. 3, a check is made whether the development program has terminated, i.e. whether the identified decision point corresponds to a termination instruction. If not, the development program continues to run at block 312 until further decision points are identified. If the development program has already terminated, however, all decision points that will be reached by that data element have already been reached. Accordingly, a check is made at block 328 whether all of the data elements have been run, in which case generation of the decision-point table for the entire input data set 108 has been completed. At block 344, this final decision-point table is output and the method stops at block 348. The decision-point table may have significant duplication of data-element identifiers since multiple decision points may be encountered through use of a single data element. Accordingly, generation of the test bed usually includes removing duplicates. In embodiments where the test bed 112 includes element identifiers, but not the complete data elements themselves, for example, the column of the final decision-point table specifying all element identifiers could be used as the test bed 112 after removal of duplicates. Generation of a test bed 112 that does include the data elements could proceed by removing duplicate data-element identifiers from the decision-point table and collecting the data elements for the unique data-element identifiers.

If not all data elements comprised by the input data set 108 have been run, a subsequent data element is used. First, however, a provision may be included for output of intermediate decision-point tables. Such intermediate decision-point tables are similar to the final decision-point table output at block 344 except that they represent results derived from only a portion of the input data set 108. The intermediate decision-point tables permit check-point functions to be performed, such as to monitor execution of the test-bed extraction program 100. A check-point value may be specified such that intermediate decision-point tables are output periodically by the test-bed extraction program 100, say after every 100,000 or 1,000,000 data elements have been considered. Thus, at block 332, a check is made whether the counter has reached the check-point value. If so, the intermediate decision-point table is output at block 340 and the counter is reset at block 304. If the counter has not reached the check-point counter, the counter is simply incremented at block 336 so that the next data element may be read from the input data set 108 at block 308 in accordance with the sequence for using the data elements as input.

The content of the decision-point tables, both intermediate and final, may depend on rules for including a particular element identifier in the tables. In some instances, such rules may ensure that the number of unique data elements identified is minimized, while still ensuring that all decision points that would be reached by use of the entire input data set 108 are reached by the identified set of unique data elements. For example, such a minimum number of unique data elements may be realized in one embodiment by recording the first data element in the sequence that reaches that decision point. Each subsequent encounter with that decision point is then ignored, so that the decision-point table provides a list of the first data elements that encounter each of the decision points. Thus, in that embodiment, for each data element run through the development program, a check is made at each decision point that is encountered whether that decision point has been recorded in the decision-point table. If so, no action is taken. If not, that decision point and the corresponding data-element identifier are added to the decision-point table.

In another embodiment, the minimum number of unique data elements may alternatively be reached by recording the last data element in the sequence that reaches that decision point. In particular, for each data element that is run through the development program, a check is made at each decision point whether that decision point has been recorded in the decision-point table. If so, the data-element identifier for the current data element is written over any previously recorded data-element identifier associated with that decision point. If not, that decision point and the corresponding data-element identifier are added to the decision-point table.

Those of skill in the art will recognize that these algorithms for constructing the decision-point table are merely exemplary. There are a variety of techniques that can be used to improve the efficiency of constructing the table. For example, various sorting techniques may be used to organize the table in a fashion that makes it easy to identify whether a particular decision point has previously been recorded. Also, the size of the decision-point table could be limited by using a pointer structure to avoid duplication of data-element identifiers by associating each such included identifier with multiple decision points. Such a structure has the advantage that removal of duplicates is avoided in generating the test bed 112.

Figures 4, 5:
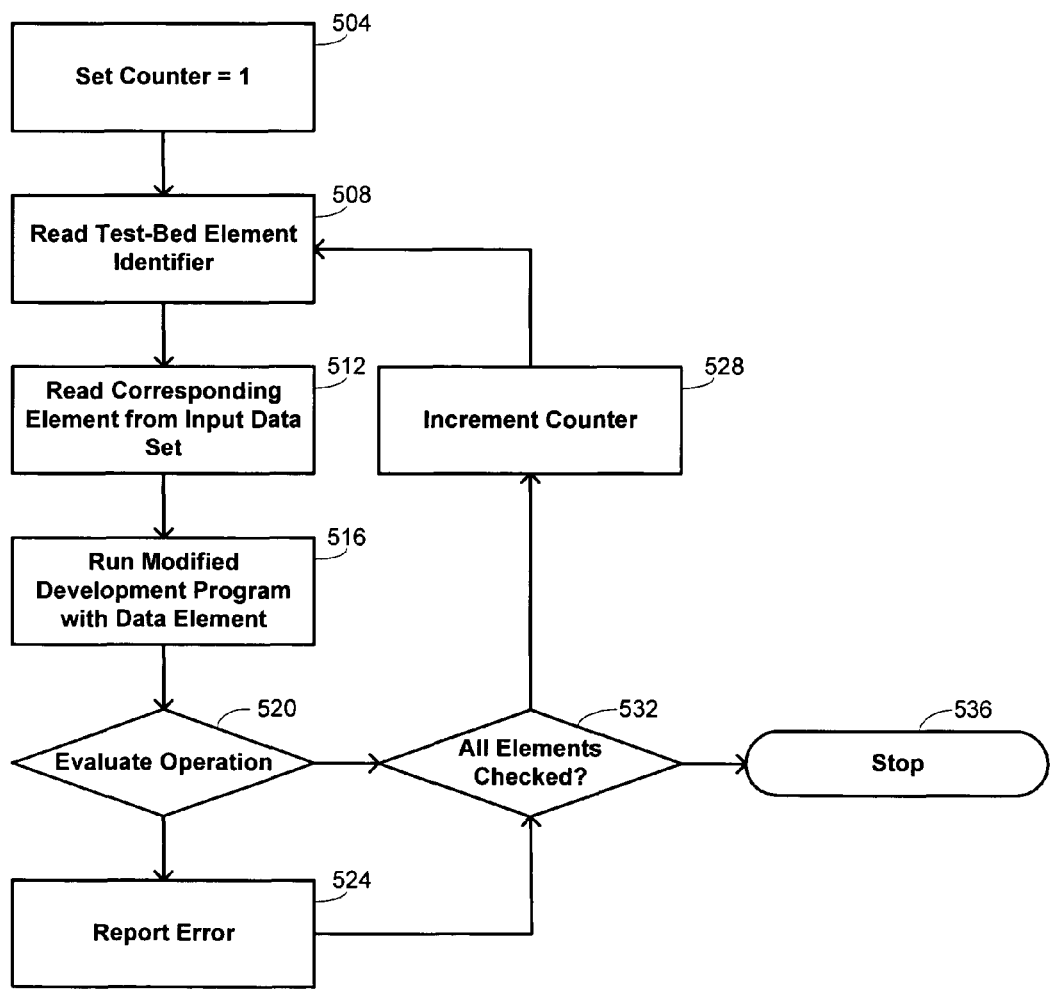
FIG. 4 provides an example of a portion of a decision-point table that may be generated in embodiments of the invention.
FIG. 5 is a flow diagram illustrating a method for testing a development program using the test bed in an embodiment of the invention.

Once the decision-point table has been generated and used to produce the test bed 112, modified development programs may be tested using only the data elements identified by the test bed 112, such as with the exemplary embodiment illustrated with the flow diagram in FIG. 5. In this embodiment, progression through each of the data elements identified by the test bed 112 may be performed sequentially, such as by using a counter that is initialized at block 504. At block 508, the corresponding test-bed element identifier is read, such as from a decision-point table as generated above. The identified data element is then read at block 512 for use as input to the modified development program. In embodiments where the test bed 112 includes the identified data elements, the functions of blocks 508 and 512 may be combined so that the data elements are read directly from the test bed in accordance with the value of the counter.

At block 516, the modified development program 104' is run and its operation evaluated at block 520. In many development projects, the majority of the decision points that were included in the original development program 104 will remain in the modified development program 104'. For example, if the modified development program 104' corresponds to a separate program that makes function calls to the original development program 104, then all decision points remain. If the modified development program 104' instead corresponds to a revision of the original development program, the number of changes in making the revision is often small in comparison to the number of operations in the entire program. In either instance, the evaluation at block 520 permits a good regression-type basis for evaluating the code.

If there is a recognizable error in the operation of the modified development program 104', it is reported at block 524 with an identification of the data element that was being run. For example, the error report could include the corresponding element identifier, the current value of parameters recognized to have some diagnostic information, where the error occurred, and the like. Such information may subsequently be used to identify how the modification of the development program introduced undesirable behavior in the code. At block 532, a check is made whether all data elements have been run through the modified development program 104', with the method stopping at block 536 if the have been and incrementing the counter at block 528 to proceed with the next data element if they have not been.

Many development projects take place over an extended period of time. In such instances, the modified development program 104' may be tested periodically as described herein. Each periodic test permits the developers to be confident that spurious behavior of the program is not being introduced by the development. Advantageously, these periodic tests may be performed much more frequently than tests could be performed using the full input data set, particularly when the number of data elements is large. As the development proceeds and the relative overlap between the modified development program 104' and original development program 104 decreases, it may be appropriate to generate a new test bed for subsequent periodic testing. The new test bed is generated with the method described in connection with FIG. 3, using the modified development program as the original development program, and may be used to test further development of the program from that point forward.

Also, in some instances, the content of the input data set may be changing over time. In the example discussed above where the input data set comprises credit-card information, the data elements may change as new credit cards are issued to customers and as existing credit cards are invalidated. In some embodiments, this change in input data set over time is used advantageously when a new test bed is generated. For example, the new test bed may be generated by using both the modified development program and the new input data set. Even more advantageously, the union of (1) the set of data elements identified with the original input data set, with (2) the set of data elements identified with the new input data set, may be used to generate the new test bed. This effectively accounts for the fact that even the new input data set may result in the development program reaching some decision points not reached by the original input data set, and may not reach some decision points that were reached by the original input data set. The union of the two permits use of the new test bed to test more decision points than either would alone.

This process may be repeated throughout a long software development process, with periodic testing being performed regularly with the test bed between widely spaced generations of new test beds. The new test beds thus progressively offer greater test coverage of decision points in the development program.

Figure 6:
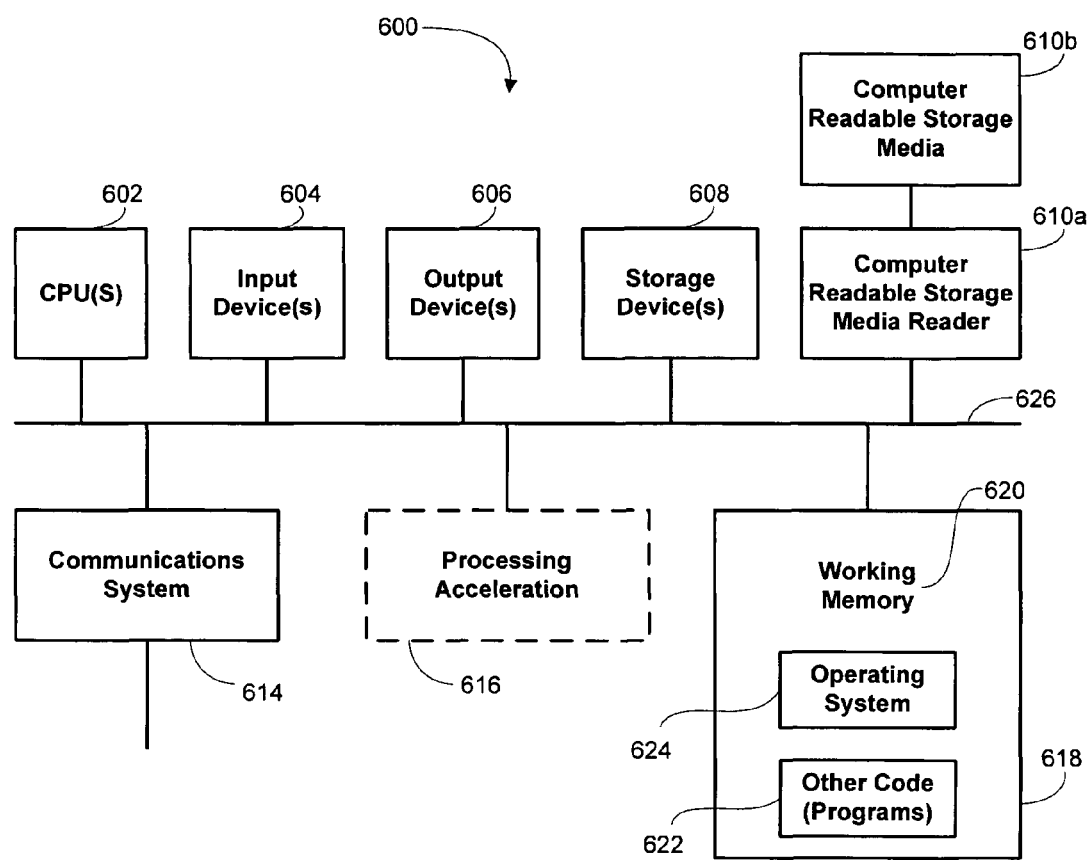
FIG. 6 is a schematic illustration of a computer system on which methods of the invention may be embodied.

FIG. 6 provides a schematic illustration of a computer system on which the methods of the invention may be embodied. FIG. 6 broadly illustrates how individual system elements may be implemented in a separated or more integrated manner. The computer system 600 is shown comprised of hardware elements that are electrically coupled via bus 626, including a processor 602, an input device 604, an output device 606, a storage device 608, a computer-readable storage media reader 610a, a communications system 614, a processing acceleration unit 616 such as a DSP or special-purpose processor, and a memory 618. The computer-readable storage media reader 610a is further connected to a computer-readable storage medium 610b, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged with the computer system 600. The input data set 108 and/or test bed 112 may be stored on the storage device(s) 608. Alternatively, the input data set 108 and/or test bed 112 may be stored separately from the computer system 600, with the communications system 614 permitting their access.

The computer system 600 also comprises software elements, shown as being currently located within working memory 620, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

EXAMPLE

The following example is provided to illustrate application of embodiments of the invention. In the example, the development program comprises software code intended for processing of credit cards. The software code is operated by an organization that services a variety of different types of credit cards and this is reflected in the development program with instructions that are relevant for certain parts of the processing. The development program may accommodate bank cards, which are widely accepted at a variety of merchants, and private-label cards, which are accepted only at specifically identified merchants. For each card, there may be processing characteristics that vary applicable interest rates for different cardholders, provide for promotional pricing for different cardholders, provide for different card-statement content for different cardholders, and other variations for different cardholders. The input data set in this example corresponds to a listing of all accounts serviced by the organization with data relevant to distinguish them according to these characteristics.

Thus, the development program includes decision points that provide for execution of different program instructions depending on these characteristics. For example, one of the cards might reach a set of instructions after affirmation of characteristics according to a following decision-point path that identifies the following: the card is a bank card; the card is a Bank A card; the card is subject to a 17% annual interest rate; the card is not entitled to promotional discounts; . . . . Another of the cards might invoke a different set of decision points: the card is a private-label card; the card is a Merchant X card; the card is subject to a 19% annual interest rate; the card is entitled to promotional discounts; . . . . Still other of the cards might invoke different decision points, and many of the decision points will be encounter multiple times. After executing the development program using the entire set of cards, a subset of these accounts is identified that will encounter all the decision points encountered by the full set. Further development of the program may thus be monitored by ensuring expected behavior using the subset of cards.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for generating a test bed from an input data set comprising a plurality of data elements, the method comprising:
   executing a development program using each of the plurality of data elements as input to the development program in a sequence;
   for each of a plurality of decision points comprised by the development program, identifying execution of such each decision point by at least one of the data elements; and
   assigning such at least one of the data elements for identification in the test bed.

2. The method recited in claim 1 wherein assigning such at least one of the data elements for identification in the test bed comprises adding an element identifier associated with such at least one of the data elements to the test bed.

3. The method recited in claim 1 wherein assigning such at least one of the data elements for identification in the test bed comprises adding such at least one of the data elements to the test bed.

4. The method recited in claim 1 wherein the at least one of the data element is a last of the plurality of data elements to be executed by the each of the plurality of decision points according to the sequence.

5. The method recited in claim 1 wherein at least one of the plurality of decision points comprises a program element having a capacity to change a logical flow of the development program.

6. The method recited in claim 1 wherein at least one of the plurality of decision points comprises a program element having a capacity to break a logical flow of the development program.

7. The method recited in claim 1 further comprising removing duplicates of the data elements assigned for identification in the test bed.

8. The method recited in claim 1 further comprising:
   executing a modification of the development program using each of a second plurality of data elements;
   for each of a plurality of decision points comprised by the modification of the development program, identifying execution of such each decision point by at least one of the second plurality of data elements;
   assigning such at least one of the second plurality of data elements for identification in the test bed.

9. A computer-readable storage medium having a computer-readable program embodied therein for directing operation of a computer system including a processor and a storage device, wherein the computer-readable program includes instructions for operating the computer system to generate a test bed from an input data set comprising a plurality of data elements in accordance with the following:
   executing a development program using each of the plurality of data elements as input to the development program in a sequence;
   for each of a plurality of decision points comprised by the development program, identifying execution of such each decision point by at least one of the data elements; and
   assigning such at least one of the data elements for identification in the test bed.

10. The computer-readable storage medium recited in claim 9 wherein instructions for assigning such at least one of the data elements for identification in the test bed comprises instructions for adding an element identifier associated with such at least one of the data elements to the test bed.

11. The computer-readable storage medium recited in claim 9 wherein instructions for assigning such at least one of the data elements for identification in the test bed comprises instructions for adding such at least one of the data elements to the test bed.

12. The computer-readable storage medium recited in claim 9 wherein the at least one of the data elements is a last of the plurality of data elements to be executed by the each of the plurality of decision points according to the sequence.

13. The computer-readable storage medium recited in claim 9 wherein at least one of the plurality of decision points comprises a program element having a capacity to change a logical flow of the development program.

14. The computer-readable storage medium recited in claim 9 wherein at least one of the plurality of decision points comprises a program element having a capacity to break a logical flow of the development program.

15. The computer-readable storage medium recited in claim 9 wherein the computer-readable program further includes instructions for removing duplicates of the data elements assigned for identification in the test bed.

16. The computer-readable storage medium recited in claim 9 wherein the computer-readable program further includes instructions for operating the computer system in accordance with the following:
    executing a modification of the development program using each of a second plurality of data elements;
    for each of a plurality of decision points comprised by the modification of the development program, identifying execution of such each decision point by at least one of the second plurality of data elements;
    assigning such at least one of the second plurality of data elements for identification in the test bed.

* * * * *